United States Patent [19]

Hahn

[11] 4,028,034

[45] June 7, 1977

[54] METHOD AND APPARATUS FOR BLOW MOLDING PLASTIC

[75] Inventor: Granville J. Hahn, Dallas, Tex.

[73] Assignee: Cosden Oil & Chemical Company, Big Spring, Tex.

[22] Filed: Feb. 14, 1975

[21] Appl. No.: 550,017

Related U.S. Application Data

[60] Division of Ser. No. 326,568, Jan. 24, 1973, Pat. No. 3,939,236, and a continuation-in-part of Ser. No. 81,488, Oct. 16, 1970.

[52] U.S. Cl. .................. 425/302 B; 425/326 B; 425/DIG. 206; 425/DIG. 212
[51] Int. Cl.² .................................. B29D 23/04
[58] Field of Search ......... 425/DIG. 204, DIG. 206, 425/DIG. 211, DIG. 212, DIG. 233, DIG. 214, 324 B, 326 B, 302 B

[56] References Cited

UNITED STATES PATENTS

| | | | |
|---|---|---|---|
| 3,217,072 | 11/1965 | Schaich | 425/DIG. 212 |
| 3,225,127 | 12/1965 | Scott | 264/98 |
| 3,456,290 | 7/1969 | Ruekberg | 425/DIG. 212 |
| 3,457,590 | 7/1969 | Dittmann | 425/DIG. 212 |
| 3,733,384 | 5/1973 | Gerlovich | 425/DIG. 204 |

FOREIGN PATENTS OR APPLICATIONS

| | | | |
|---|---|---|---|
| 1,501,501 | 11/1967 | France | 425/DIG. 204 |
| 1,809,033 | 7/1969 | Germany | 425/DIG. 206 |

Primary Examiner—Francis S. Husar
Assistant Examiner—Carl Rowold
Attorney, Agent, or Firm—S. B. Wiczer

[57] ABSTRACT

The invention disclosed is for a method and apparatus for blow molding foam walled plastic using a quadrisectional mold. A parison of foamed plastic may be blow molded to assume the contour of the closed mold, after which the molded shape is severed into two portions and ejected. Desirably, cellular plastic is blow molded to form hot drink cups.

3 Claims, 8 Drawing Figures

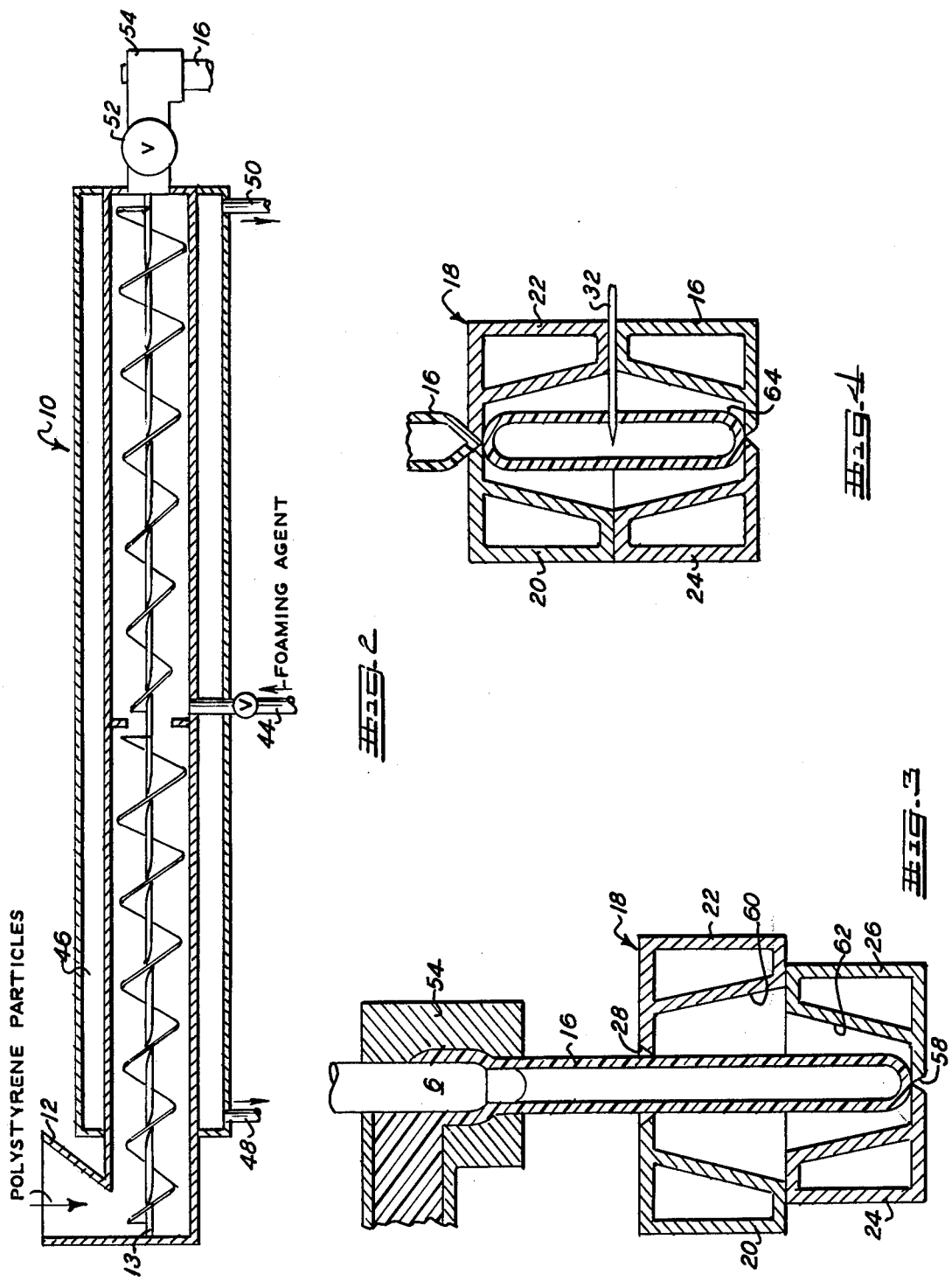

METHOD AND APPARATUS FOR BLOW MOLDING PLASTIC

This invention is a division of application Ser. No. 326,568 filed Jan. 24, 1973, now U.S. Pat. No. 3,939,236 issued in turn (a); Continuation-in-Part of copending application Ser. No. 81,488 filed Oct. 16, 1970.

This invention relates to a method and apparatus for blow molding of foamed plastic containers. More particularly, the present invention provides an effective means for preparing a molded foam container article such as hot drink cups by blow molding a cellular plastic in a section mold to form a foam walled body shaped as a pair of cups and means for severing the shaped articles into two useful open top portions; and the combined apparatus elements for forming such container bodies.

Various methods have been proposed for preparing hollow plastic articles. One of the most common methods includes placing a parison of heat-softened plastic within a mold and then blow molding the plastic such that it conforms and assumes the contour of the mold cavity. Typically, these methods apply to formation of unitary configurated articles which are blow molded using noncellular plastic materials. It has now been found that by practice of the present invention, an apparatus and method are provided which permit formation of severable foam walled articles using blow molding techniques. The present invention thus provides simple duplication of articles with a high degree of accuracy which may be repeated with maximum efficiency.

Broadly stated, the apparatus of the present invention includes a sectional mold preferably having an upper left mold quadrant, an upper right mold quadrant, a lower left mold quadrant and a lower right mold quadrant all forming a mold cavity when joined. The upper mold quadrants are movable relative to each other as are the lower mold quadrants. Also, the upper mold quadrants are movable relative to the lower mold quadrants to permit a severing means to move transverse a molded article disposed therebetween.

The method of the present invention generally provides for extruding cellular plastic through an annular orifice to form a tubular configuration. The tubular configuration is first received by a quadrisectional mold and the lower quadrants thereof are closed. Desirably, the bottom joining edges of the lower quadrants pinch and sever the lower edge of the foamed plastic tube. Next, the upper quadrants are joined and positioned over the lower quadrants to form a cavity about the foam walled plastic or parison tube. Desirably, the upper joining edges of the upper quadrants also pinch and sever the plastic tube at the top of the length to be blow molded. The cavity confined plastic tube or parison is blow molded to assume the contour of the cavity of the closed mold. Next, the upper and lower quadrants of the mold are separated and the article within the mold is severed into two portions. Thereafter, the bottom quadrants of the mold as well as the upper mold quadrants, if desired, are opened to permit two molded articles to eject from the cavity.

The present method is superior in that the blow molded foam formed into a pair of containers, such as cups, are severed apart with a single cut by a thin cutting instrument applied to the molded product at their joint at the point of mouth to mouth joinder of the cups; the single applied cut leaving no scrap material and resulting by that single cut in production of two finished cups. Particularly it is preferred to sever the cups by using a thin hot wire which not only effects the thin cut to separate the molding into two cups, but warms and melts the severed cup edges and fire polishes the cut edges, whereby the cups are actually finished and are ready for use by the single hot wire cut. Moreover, it is preferred to apply the cut, usually at the exact center line of joinder of the cups, in a manner to intercept and efface the needle hole that may remain from insertion of the blowing needle into the median line of the two cups formed in the blow molding, whereby the hot wire removes any remnant, irregularity or residue of the needle hole in the single hot melting or fire polishing cut.

The apparatus described herein is readily incorporated into an automatic arrangement for manufacture of plastic articles such as foam walled drinking cups, and requires a minimum of supervision. Additional aspects and advantages of the invention will become apparent from the following detailed description of a preferred embodiment considered together with the accompanying drawings in which:

FIG. 1 diagrammatically illustrates in perspective preparation of articles using the method and apparatus of the present invention;

FIG. 2 is a side elevational view taken in half-section of an extrusion unit;

FIG. 3 diagrammatically illustrates introduction of a parison into a quadrisectional mold;

FIG. 4 diagrammatically illustrates in half-section the positioning of a parison within the quadrisectional mold prior to blow molding;

Although the present invention will be described hereinafter with particular reference to foam walled polystyrene products, it is recognized that other cellular plastics may be used including without limitations plastics such as polyethylene, polybiochloride, polyurethane elastomers, cellulose acetate, styrene acrylonitrile, ethylene propylene copolymers, and the like. High impact polystryrene containing about 5% to about 25% polybutadiene is especially useful for preparing hot drink cups by the practice hereof.

Practice of the present invention becomes more apparent with reference to the figures wherein similar elements are referred to by similar numerals throughout these several views.

Figure 1:
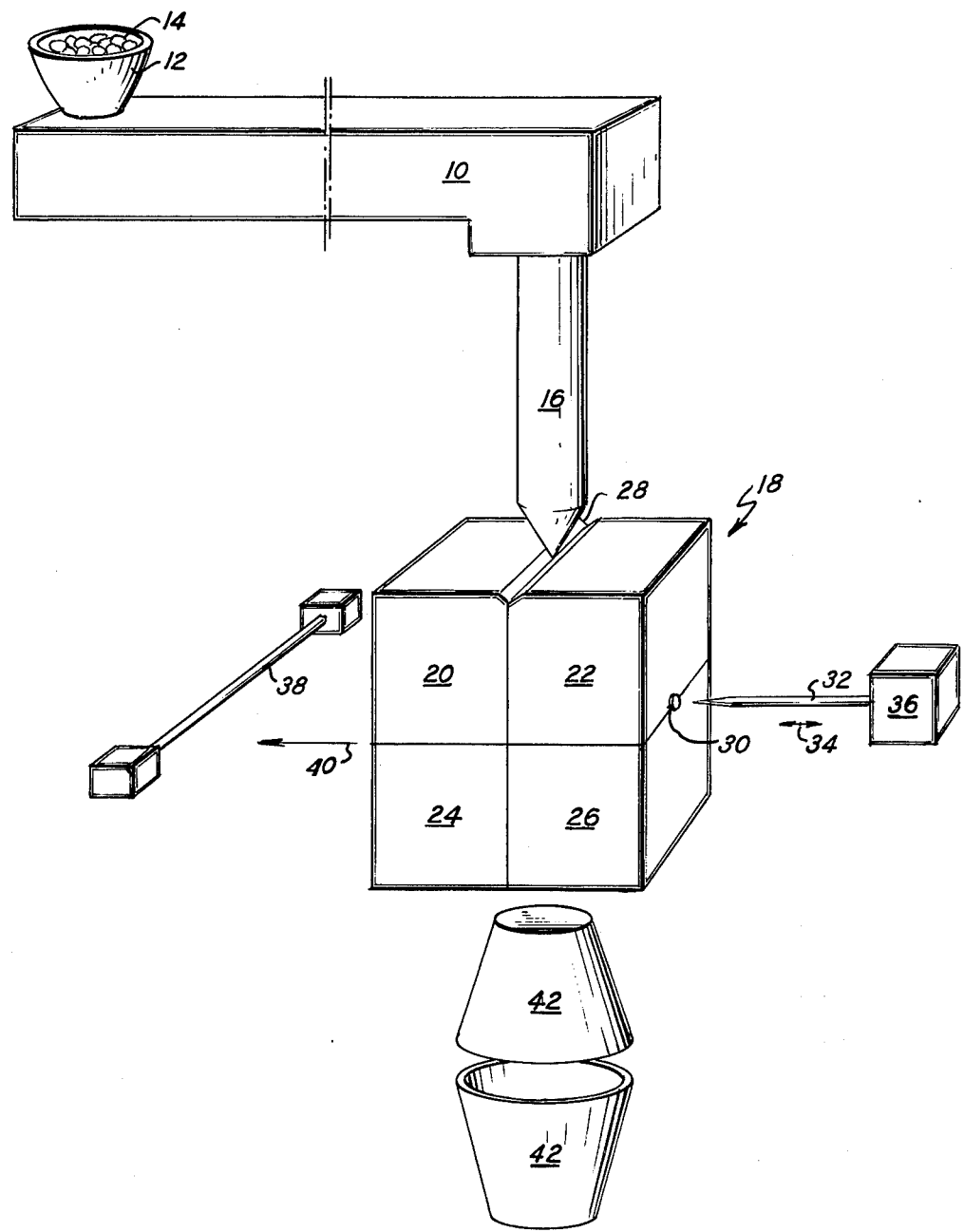

Referring to FIG. 1, wherein the method and apparatus of the present invention is diagrammatically illustrated, extrusion unit 10 includes a hopper or funnel shaped plastic supply 12 wherein particles of polystyrene 14 may be introduced. The particles are extruded from extrusion unit 10 as a tubular configuration 16 for introduction within quadrisectional mold 18. The quadrisectional mold includes an upper left quadrant 20, an upper right quadrant 22, a lower left quadrant 24, and a lower right quadrant 26. Edges may be provided between the upper quadrants 20 and 22 appearing as pinching surface 28 for severing and pinching or constricting the tubular configuration 16. Provided between quadrants 22 and 26 there appears needle entrance 30 into which a hollow needle 32 may be introduced as indicated by arrow 34 for blow molding using a conventional system generally illustrated as element 36.

After an article is blow molded within quadrisectional mold 18 using an expanding fluid such as air or nitrogen through hollow needle 32, the article may be severed into two portions using a severing means such as hot wire 38 which travels horizontally between quadrants 20 – 22 and quadrants 24 – 26 in the direction of arrow 40. After the blow molded article is severed, it is ejected from quadrisectional mold 18 and appears as, for example, hot drink cups 42. The hot wire 38 is preferably thin and hot enough to melt the plastic wall as it severs the product into two blow molded containers, leaving a smooth 'fire-polished' rim at the top of the severed cups resulting in a smooth melted top cup rim on both cups formed as the hot wire passes through the plastic wall in a single cut, severing the molded product into halves. In this manner of cutting no scrap material results and the single cut thereby produces two finished cups without scrap material, each cup having 'fire-polished' rims. It is desirable, of course, to apply the hollow needle exactly in the median line between the two cups and to apply the hot wire to sever the molding into the two cups with the wire passing through the wall at the exact position of the needle hole, thereby effacing any slight imperfection that might appear in the rim of the cup, as formed by the insertion of the needle during the blowing.

Referring to FIG. 2, extrusion unit 10 is illustrated in greater detail with particles of polystyrene introduced within funnel 12. Extruder 10 may be fed with conventional expandable polystyrene beads which contain the proper amount of incorporated foaming agent or alternatively such foaming agent may be applied to the polystyrene within the extrusion unit through inlet 44. Volatile foaming agents useful herein typically have boiling points below about 110° C at atmospheric pressure. Among liquid foaming agents, aliphatic hydrocarbons containing isomers of $C_5$ to $C_7$ and halogenated hydrocarbons are especially useful. Low boiling alcohols, ethers, ketones and aromatic hydrocarbons may also be used. Aliphatic hydrocarbons are useful in production of cellular polystyrene and may be prepared by dissolving the liquid foaming agent in the polymer under moderate pressures and subsequently extruding the gas-saturated melt with simultaneous cooling.

It will thus be apparent that foaming agents for preparing cellular plastics may vary in a wide range of formulation and types, depending on the plastic, temperature, product uses and the like. The foaming agent may be employed with or without nucleating agents, as desired. Specific examples of useful foaming agents include pentane, neo-pentane, hexane, iso-hexane, heptane, benzene, methylene chloride, dichlorotetrafluoroethane and related chloro-fluoroethanes, simple organic or inorganic salts of carbonates, bicarbonates, oxylates, sodium borohydride, azo bis-formamide, and related aliphatic azo compounds.

Extrusion unit 10 includes extruder 12 which advances polystyrene pellets at relative low temperatures of about 250° F to 260° F along a long inner barrel of the extruder. A screw with great depth at the feed and decreasing toward the metering end is especially desirable. A low compression ratio of about 2 : 1 to about 3 : 1 is generally sufficient. This ratio improves quality substantially and primarily in that rupture of cells is limited.

Extruder 10 may include heating chamber 46 into which fluid may be introduced such as through inlet 48 and removed through outlet 50, as desired. At the exit end of extruder 10, metering valve 52 may be included as desired to regulate the exit flow of the cellular polystyrene forming a tubular configuration 16.

FIG. 3 illustrates in greater detail extrusion of the tubular configuration of polystyrene 16 from extrusion outlet 54 which includes shaping rod 6 to provide the necessary annular outlet for extrusion of the tubular configuration.

Quadrisectional mold 18 having bottom quadrants 24 and 26 joining by edge 58 which provides a means for severing and pinching the tubular configuration 16 to provide a closed lower end thereof when introduced into the mold. After the tubular configuration 16 appearing as a parison within the mold is in position, upper quadrants 20 and 22 are closed with edge 28 severing and pinching an upper portion of the parison. When the quadrants of the mold are closed, the cavity thereby formed is illustrated as two joined hot drink cups formed by surfaces 60 by the upper quadrants and surfaces 62 by the lower quadrants of the mold.

To effect blow molding of parison 64 within quadrisectional mold 18, hollow needle 32 is introduced into the parison. With the parison closed at both ends, air may be introduced through the needle which pierces the tube in the central portion of the molded piece. An alternate means for introducing air into the parison is by use of a gas-liberating pellet which may be dropped into the parison as the mold closes. The pellet may then release a gas which blows the parison into the shape of the mold cavity such as is generally described in U.S. Pat. No. 2,975,472.

Figure 5:
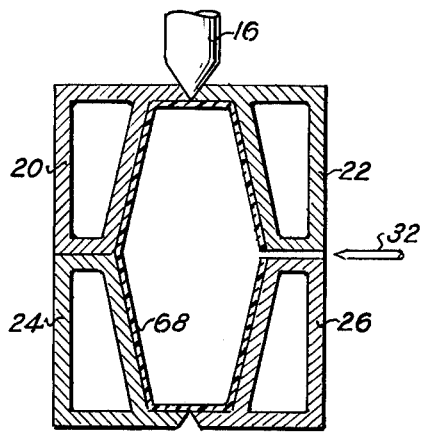
FIG. 5 illustrates diagrammatically in half-section blow molding of an article within the quadrisectional mold.

After the parison has been blow molded it assumes the contour of the cavity of the mold as illustrated in FIG. 5. The mold may include if desired a chamber through which a heating fluid such as steam or the like may be introduced to maintain proper temperature conditions during molding. The amount of heat which is supplied will depend to a considerable extent upon the rapidity of molding operation, and the size and shape of the articles being molded. If desired, additional heating means may be included to keep the parison in soft condition while the mold is being operated.

Figure 6:
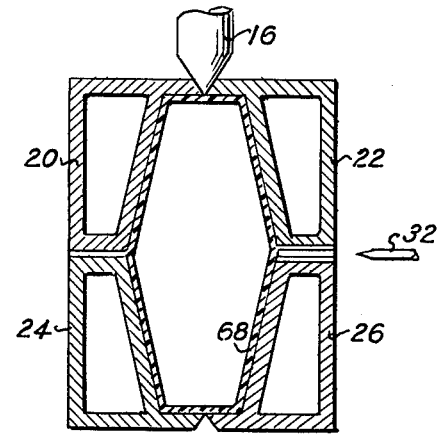
FIG. 6 illustrates diagrammatically in half-section severing of an article blow molded within the quadrisectional mold.
Figure 7:
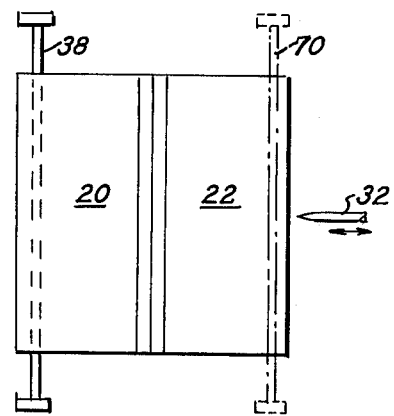
FIG. 7 illustrates as a top elevational view severing of an article within the quadrisectional mold.

After the article has been blow molded, and as illustrated in FIG. 6, the upper quadrants 20 and 22 are separated relative to lower quadrants 24 and 26 to permit a small passageway for introduction of article severing means 38 desirably appearing as a hot wire. Because of the compressable nature of the foam, severing must be done with either very sharp tools or by the hot wire process. The severing means is passed between the parted quadrants and thereby severs molded article 68 appearing within the cavity. Severing of the article is illustrated further in FIG. 7 with severing means 38 moving to phantom position 70.

Figure 8:
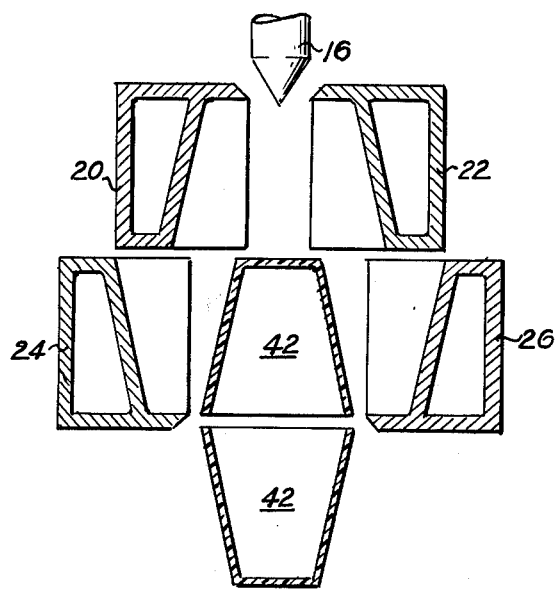
FIG. 8 illustrates diagrammatically in half-section ejection of blow molded articles from the quadrisectional mold.

After the article has been severed, and specifically referring to FIG. 8, the lower quadrants 24 and 26 of the mold are separated thereby permitting ejection of the severed article from the mold cavity. The article now appears as hot drink cups 42. Upon introduction of parison 16, the process is repeated in preparation of additional articles as described.

The following example illustrates the practice of this invention:

EXAMPLE I

Particles of polystyrene homopolymer are fed to an extrusion device as shown in FIG. 1. The device consists of a screw enclosed by a heated barrel and driven by a gear reducer. The screw consists of a feed section and a gas injection section. The polymer particles move along said screw and are gradually converted to a homogeneous melt phase. This melt is forced over a restricted area of the screw and into the gas injection zone. At this point nitrogen is injected and the screw mixes said nitrogen with the polymer to form a homogeneous mixture. This mixture exits the extrusion device through a back pressure valve and an annular orifice approximately one inch in diameter. The extruded polystyrene nitrogen mixture foams as the pressure decreases through the back pressure valve. The foam emerges from the orifice in the form of a pipe or tube. Another device containing a two-part mold and means for opening and closing said mold is positioned near the orifice such that with the two parts of the mold held apart, the tube of foam is extruded in the open air between the parts. When the foam tube has extruded as far as the lower end of the two-part mold, the mold is made to close and cut off both ends of the foam tube. The two-part mold is rotated away from the extrusion device and compressed air is immediately injected into the interior of the foam tube causing the tube of foam to conform to the mold shape. The mold shape approximates a short cylinder with the center of larger diameter than the two ends. The mold, cooled with water, rapidly cools the polymer below 150° F such that the foam hardens and retains the mold shape. The two-part mold is caused to open and the cylinder shaped foam falls out. Both ends are sealed with foam. A hot wire device is used to cut the cylinder perpendicular to its radial axis such that two pieces of foam are obtained. The two parts are cup shaped with an open top end diameter slightly larger than the sealed bottom end diameter.

The various mechanisms for the mechanical operation of the present system have not been described in detail herein since such mechanisms are well-known in the art. The various parts may be supported in any desired manner relative to one another and accordingly, although a preferred embodiment of the invention has been illustrated herein, it is to be understood that various changes and modifications may be made in the construction and arrangement of elements without departing from the spirit and scope of the invention as defined.

What is claimed is:

1. An apparatus for blow molding which comprises a split quadrisectional mold having an upper left mold quadrant, an upper right mold quadrant, a lower left mold quadrant and a lower right mold quadrant; said quadrants forming a mold cavity when joined; means connected to said upper mold quadrants for separately moving said upper mold quadrants relative to each other; means connected to said lower mold quadrants for separately moving said lower mold quadrants relative to each other; means connected to said upper mold quadrants for moving said upper mold quadrants relative to said lower mold quadrants; a hollow needle-like blowing means adjacent said mold and insertable through the mold center to blow mold a foamed plastic parison in the mold cavity to the shape of the mold; and cutting means adjacent said mold and insertable between upper and lower mold sections after blow molding said parison through said needle penetrated center for smoothly severing the blow mold product through the needle penetrated center to divide the same into substantially equal duplicate smoothly cut finished molded halves, said severing means being thin and adapted to pass as a single cut through the walls of the plastic molding and through the needle penetrated center without leaving any significant scrap residue.

2. The apparatus of claim 1 wherein the cutting means is a hot wire and wherein the molded product is a foamed plastic container and the hot wire severing means passes through the center and severs the molded product into two open-mouthed containers in a single cut, said hot wire severing means being thin and adapted to pass as a single hot melting cut through the walls of the plastic molding, melting said plastic as it passes to leave a smooth container lip or edge upon the severed wall portion.

3. The apparatus of claim 1 wherein the mold cavity has the shape of joined cups.

* * * * *